United States Patent [19]
Herley

[11] Patent Number: 6,044,177
[45] Date of Patent: Mar. 28, 2000

[54] ARTIFACT REDUCTION DECOMPRESSION METHOD AND APPARATUS FOR INTERPOLATED IMAGES

[75] Inventor: Cormac Herley, Los Gatos, Calif.

[73] Assignee: Hewlett-Packard Company, Palo Alto, Calif.

[21] Appl. No.: 08/878,169

[22] Filed: Jun. 18, 1997

[51] Int. Cl.[7] .............................. G06K 9/36; H04N 1/46; H04N 7/12

[52] U.S. Cl. .......................... 382/233; 382/239; 382/248; 382/166; 358/525; 348/424

[58] Field of Search ................................. 348/392, 399, 348/424; 382/166, 232, 233, 239, 248; 358/525

[56] References Cited

U.S. PATENT DOCUMENTS

| | | | |
|---|---|---|---|
| 5,249,053 | 9/1993 | Jain | 348/231 |
| 5,379,122 | 1/1995 | Eschbach | 358/426 |
| 5,442,718 | 8/1995 | Kobayashi et al. | 382/166 |
| 5,521,718 | 5/1996 | Eshbach | 358/432 |
| 5,528,292 | 6/1996 | Ikeda | 348/222 |
| 5,600,373 | 2/1997 | Chui et al. | 348/397 |
| 5,604,824 | 2/1997 | Chui et al. | 382/248 |
| 5,613,091 | 3/1997 | Stone et al. | 395/500 |
| 5,647,024 | 7/1997 | Kawauchi et al. | 382/232 |
| 5,703,965 | 12/1997 | Fu et al. | 382/232 |
| 5,774,597 | 6/1998 | Wilson | 382/250 |
| 5,832,120 | 11/1998 | Prabhakar et al. | 382/233 |
| 5,861,962 | 1/1999 | Maeda | 358/451 |

OTHER PUBLICATIONS

European Search Report, Application No.: EP 98 30 4742, dated Sep. 29, 1999.

Yongyi Yang, et al.; "Projection–Based Spatially Adaptive Reconstruction of Block–Transform Compressed Images"; IEEE Transactions on Image Processing, vol. 4, No. 7, Jul. 1, 1995, pp. 896–908.

Zhigang Fan, et al.; "JPEG Decompression With Reduced Artifacts"; Proc. SPIE–Int. Soc. Opt. Eng., vol. 2186; Feb. 1994; pp. 50–55.

Yongyi Yang, et al.; Edge–Preserving Reconstruction of Compressed Images Using Projections and a Divide–and–Conquer Strategy; Proceedings of the International Conference on Image Processing (IC, Austin, Nov. 13–16, 1994; vol. 2, pp. 535–539.

Image Restoration by the Method of Convex Projections: Part 1—Theory, D.C. Youla et al; IEEE Transaction on Medical Imaging, vol. MI–1, No. 2, pp. 81–94, Oct. 1982.

(List continued on next page.)

*Primary Examiner*—Amelia Au
*Assistant Examiner*—Mehrdad Dastouri

[57] ABSTRACT

A method to reduce the distortion introduced by lossy compression of interpolated images. The interpolation represents a constraint. If the output of the compression algorithm does not satisfy the constraint then the estimate of the output can be improved by re-imposing the constraint. An alternating projection algorithm is used to impose both the interpolation constraint, and the requirement that the image compress to the observed compressed output. This involves finding the orthogonal projection alternately on the space of interpolated images, and on the set of images that quantize to the appropriate image produced by the compression algorithm. Although this algorithm is not restricted to the correction of errors in block coding schemes, the explicit introduction of the interpolation constraint allows this algorithm to outperform all other iterative algorithms that attempt only to remove blocking artifacts introduced by transform coders. An important special case is the case of color interpolated images, and JPEG compression. This method is able to improve the output image both in terms of mean squared error and visual appearance.

15 Claims, 10 Drawing Sheets

OTHER PUBLICATIONS

Comments on "Iterative Procedures for Reduction of Blocking Effects in Transform Image Coding", S.J. Reeves et al; IEEE Transaction on Circuits and Systems for Video Technology, ISSN 1051–8215, vol. 3, Issue 6, pp. 439–440, Dec. 1993.

Iterative Procedures for Reduction of Blocking Effects in Transform Image Coding, A. Zakhor; IEEE Transaction on Circuits and Systems for Video Technology, ISSN: 1051–8215, vol. 2, Issue 1, pp. 91–95, Mar. 1992.

Regularized Reconstruction to Reduce Blocking Artifacts of Block Discrete Cosine transform Compressed Images, Yang etal; IEEE Transaction on Circuits and Systems for Video Technology, ISSN 1051–8215, vol. 3, Issue 6, pp. 421–432, Dec. 1993.

Iterative Projection Algorithms for Removing the Blocking Artifacts of Block–DCT Compressed Images, Yang et al; IEEE International Conference on Acoustics, Speech, and Signal Processing, ISBN: 0–7803–0946–4, vol. 5, pp. 405–408, Apr. 1993.

| GREEN 200 | RED 201 | GREEN 202 | RED 203 |
|---|---|---|---|
| BLUE 210 | GREEN 211 | BLUE 212 | GREEN 213 |
| GREEN 220 | RED 221 | GREEN 222 | RED 223 |
| BLUE 230 | GREEN 231 | BLUE 232 | GREEN 233 |

*Figure 2*

| RED 300 | BLUE 301 | RED 302 | BLUE 303 |
|---|---|---|---|
| GREEN 310 | RED 311 | GREEN 312 | RED 313 |
| RED 320 | BLUE 321 | RED 322 | BLUE 323 |
| GREEN 330 | RED 331 | GREEN 332 | RED 333 |

*Figure 3*

| | | | |
|---|---|---|---|
| BLUE 400 | GREEN 401 | BLUE 402 | GREEN 403 |
| RED 410 | BLUE 411 | RED 412 | BLUE 413 |
| BLUE 420 | GREEN 421 | BLUE 422 | GREEN 423 |
| RED 430 | BLUE 431 | RED 432 | BLUE 433 |

*Figure 4*

ARTIFACT REDUCTION DECOMPRESSION METHOD AND APPARATUS FOR INTERPOLATED IMAGES

BACKGROUND OF THE INVENTION

1. Field of the Invention

The present invention relates to digital image processing and, more particularly, to decompressing interpolated images.

2. Description of the Related Art

In many image processing pipelines a compromise has to be made between the number of bits used to store an image and the distortion introduced by compressing it. Although lossless compression schemes can achieve some saving of the storage required, for larger compression ratios it is usually necessary to use a lossy compression method. Many lossy compression schemes are known, JPEG (Joint Photographic Experts Group) is typical of such schemes. See, for example, the baseline version of the JPEG algorithm (ITU-T Rec.T.81/ISO/IEC 10918-1 "Digital Compression and Coding of Digital Still Images").

Although lossy coders are typically designed so that the loss introduced is as imperceptible as possible, there will always be artifacts of the compression and these become increasingly objectionable as the compression ratio is increased. Sometimes it is possible to improve the compressed image, for example by attempting to remove the blocking artifacts of JPEG (see, for example, R. Eschbach, Decompression of Standard ADCT-compressed Images, U.S. Pat. No. 5,379,122, January 1995), but in general there is limited room for improvement of compressed images.

Thus, it can be seen that lossy image compression techniques impose image fidelity limits upon image capture or display devices, and hinder the use of these devices in many applications.

Therefore, there is an unresolved need for an image decompression technique that can improve the fidelity of decompressed lossy-compressed interpolated images by decreasing the error introduced for a given compression ratio.

SUMMARY OF THE INVENTION

A process and apparatus is described to reduce the distortion introduced by lossy compression of interpolated images. The interpolation represents a constraint. If the output of the compression algorithm does not satisfy the constraint then the estimate of the output can be improved by re-imposing the constraint. An alternating projection algorithm is used to impose both the interpolation constraint, and the requirement that the image compress to the observed compressed output. This involves finding the orthogonal projection alternately on the space of interpolated images, and on the set of images that quantize to the appropriate image produced by the compression algorithm.

Although this algorithm is not restricted to the correction of errors in block coding schemes, the explicit introduction of the interpolation constraint allows this algorithm to outperform all other iterative algorithms that attempt only to remove blocking artifacts introduced by transform coders.

An important special case is the case of color interpolated images, and JPEG compression. This method is able to improve the output image both in terms of mean squared error and visual appearance.

BRIEF DESCRIPTION OF THE DRAWINGS

The invention will be readily understood by the following detailed description in conjunction with the accompanying drawings, wherein like reference numerals designate like structural elements, and in which:

FIG. 2 is a diagram illustrating a raw data (R) mosaic suitable for applying image compression artifact reduction according to the present invention;

FIG. 3 is a diagram illustrating a first interpolated data ($I_0$) mosaic suitable for applying image compression artifact reduction according to the present invention;

FIG. 4 is a diagram illustrating a second interpolated data ($I_1$) mosaic suitable for applying image compression artifact reduction according to the present invention;

DETAILED DESCRIPTION OF THE INVENTION

Embodiments of the invention are discussed below with reference to FIGS. 1–8. Those skilled in the art will readily appreciate that the detailed description given herein with respect to these figures is for explanatory purposes, however, because the invention extends beyond these limited embodiments.

Figure 1:
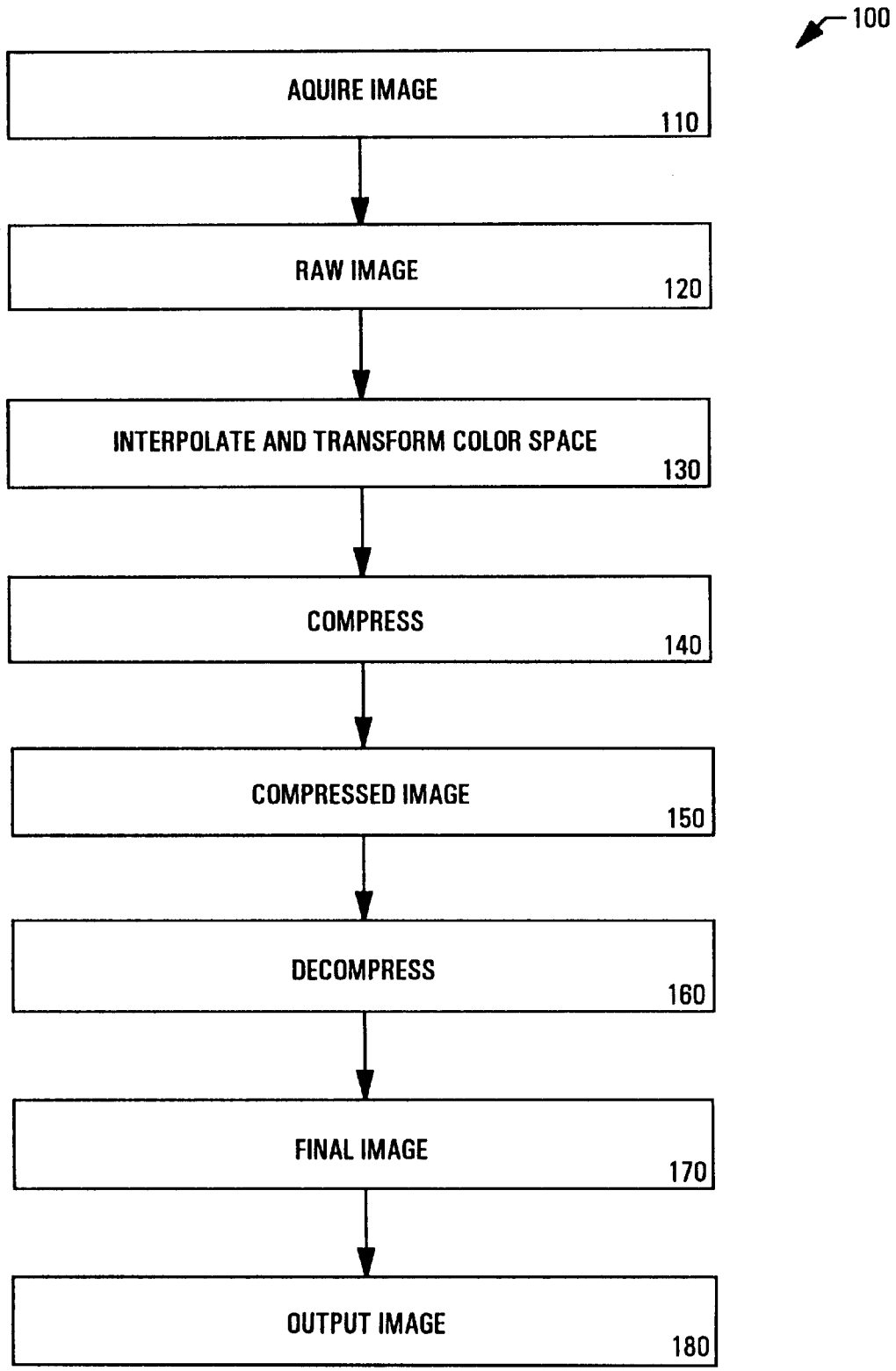
FIG. 1 is a block diagram illustrating an apparatus for processing a digital image using an interpolated image decompression scheme that practices image compression artifact reduction according to the present invention.

FIG. 1 is a block diagram illustrating an apparatus 100 for processing a digital image using an interpolated image decompression scheme that practices image compression artifact reduction according to the present invention. In FIG. 1, a raw digital color image 120 is acquired 110. Raw image 120 undergoes interpolation and color space transformation 130 before being compressed 140, which yields compressed image 150. Final image 170 is decompressed 160 from compressed image 150 so that final image 170 can be output 180.

Although the following discussion will be made within the context of a digital camera and color interpolation, the image compression artifact reduction scheme can be practiced on any interpolated digital image. For example, where a color or grayscale image is interpolated to alter its size. Also for example, for alternate embodiments, image acquisition 110 can be performed by a facsimile or scanning apparatus. Similarly, output of final image 170 can be performed by any known image output device, (e.g., a printer or display device). Furthermore, although the following discussion will use a 24-bit digital color image as an example, it is to be understood that images having pixels with other color resolution may be used. Moreover, although the JPEG algorithm will be used in the example, it is to be understood that the image compression artifact reduction scheme can be practiced on any similar lossy compression.

To get the maximum benefit from the JPEG algorithm, it is usual to transform to a luminance/chrominance space such as YUV or YCrCb. To carry out this transformation it is first necessary to demosaic the image to have a full 24-bit image. There are a variety of algorithms that carry out this color interpolation.

The Color Interpolation Block

The raw data of digital color image 110 typically consists of a mosaic of data samples from the three color planes. Before using an algorithm such as JPEG, we must interpolate to a 24-bit image. In other words, to the raw data image R shown in FIG. 2, we must add the two images $I_0$ and $I_1$ shown in FIGS. 3 and 4, respectively, to make the full color image. Obviously these last two images are calculated from the raw data R and contain no new information. We will refer to the full 24-bit image in terms of three planes, i.e. we shall denote the image $(R, I_0, I_1)$.

Thus, FIG. 2 is a diagram illustrating a raw data (R) mosaic suitable for applying mosaiced image compression artifact reduction according to the present invention. FIGS. 3 and 4 are corresponding diagrams that respectively illustrate first and second interpolated data ($I_0$ and $I_1$) mosaics suitable for applying mosaiced image compression artifact reduction according to the present invention. In FIG. 2, red sensors (201, 203, 221, 223), green sensors (200, 202, 211, 213, 220, 222, 231, 233) and blue sensors (210, 212, 230, 232) are arranged in a four-by-four mosaic. The color mosaic of FIG. 2 is an example only. Various other mosaic patterns are possible.

The values measured by the sensor of the mosaic are then interpolated to provide the missing values. For example, according to a bilinear interpolation scheme, a red value for the location of green sensor 211 can be formed by averaging the red values measured by red sensors 201 and 221. This is shown as interpolated red value 311 of FIG. 3. Similarly, a blue value for the location of green sensor 211 can be formed by averaging the blue values measured by blue sensors 210 and 212. This is shown as interpolated blue value 411 of FIG. 4.

Therefore, in FIG. 3, red values (300, 302, 311, 313, 320, 322, 331, 333), green values (310, 312, 330, 332) and blue values (301, 303, 321, 322) are arranged in an interpolated four-by-four mosaic which corresponds to the four-by-four sensor mosaic of FIG. 2. Similarly, in FIG. 4, red values (410, 412, 430, 432), green values (401, 403, 421, 422) and blue values (400, 402, 411, 413, 420, 422, 431, 433) are arranged in an interpolated four-by-four mosaic which corresponds to the four-by-four sensor mosaic of FIG. 2.

Having been demosaiced, the 24-bit image is color transformed and JPEG compressed, which of course involves some loss. The loss is typically spread throughout all of the colors at all of the locations and introduces undesirable artifacts into the decompressed image. However, as will be described below in greater detail, the decompression technique of apparatus 100 has been modified to use an interpolated image decompression scheme that practices image compression artifact reduction according to the present invention.

Image compression artifact reduction according to the present invention operates by exploiting the fact that sometimes one has some a priori information about the image. For example, that the image possesses some property which is easily identifiable.

Consider the simple case where an image has been scaled by a factor of four using pixel replication. In this case we know that 4×4 blocks of pixels have identical values in the original image. After the image goes through a lossy compression algorithm however, pixels in those 4×4 blocks will no longer have identical values, because the quantization noise added by the compression affects individual pixels differently (although they will probably be numerically close).

We know that the original came from the set of images that was pixel replicated by four so we can improve our estimate of the decompressed image if we restrict our attention only to those images that have this property. We could in fact improve our estimate of the original value in a given 4×4 block by replacing the current values by the average over the whole block. Thus, instead of taking the compressed image, we select from among the set of images that are pixel replicated by four, the one that is closest to the compressed original. Although simplified for didactic purposes, this is the basis of the post-processing algorithm that we apply.

Post-processing Algorithm

In general when considering a compressed image, we know only one thing about the original from which it is derived, namely that the original compresses to the image output by the compression algorithm. However, if the image has been interpolated by some known algorithm, we then know two things about the original image. First, we know that the image has been interpolated in the prescribed way. Secondly, we know that the image compresses to the image output by the compression algorithm The decompressed image satisfies the second of these properties, but not the first. If we could find an image that had both properties then this image would satisfy all of the properties that we know the original image to possess.

An algorithm to find an image that satisfies two constraints is the algorithm of Projection On Convex Sets (POCS). Provided that each of the constraints corresponds to a convex set in the image space, we can find an image that satisfies both by alternately taking the orthogonal projection on the two sets. Taking the orthogonal projection merely means finding the closest image (using some appropriate measure of distance) with the desired constraint. The algorithm thus can be written:

0. Start with an estimate of the decompressed image.
   1. Find the closest image that has been interpolated in the prescribed way.
   2. Find the closest image that compresses to the same compressed output as the original.
   3. GOTO 1 unless convergence.

This algorithm is known to converge to an image that satisfies both constraints. Although perfect convergence occurs only after an infinite number of iterations, in practice excellent results are often achieved after a finite and small number of iterations. Even a single iteration often improves the solution considerably.

Recall that the algorithm works provided the constraint sets are convex, and we can implement orthogonal projections onto them. Fortunately the set of images that have been interpolated by a linear algorithm such as bilinear interpolation corresponds to a space, which is always convex. The set of images that compress to a given compressed image also corresponds to a convex set. Usually, the image is transformed using some linear transformation, and the transform coefficients are quantized using scalar quantizers. The set of images that compress to the same output using such a system is always convex provided that the linear transformation is unitary.

Performing the orthogonal projections onto these two sets can be complex depending on the exact nature of the interpolation and compression scheme used. However, for most interpolation schemes the appropriate projection can be carried out using two filtering operations.

Projection onto Space of Interpolated Signals

As mentioned, carrying out the orthogonal projection onto the space of interpolated images is easily performed. We explain the one dimensional case for simplicity. A one dimensional interpolated signal can be expressed as $$x(n) = \sum_k h(n + kM) y(n)$$

where M is the interpolation factor, and $h(\cdot)$ is the interpolating filter kernel. The orthogonal projection onto the space of such signals can be implemented using the system 800 set forth in FIG. 8. In this figure, $$G(e^{j\omega}) = \frac{H(e^{j\omega})}{\sqrt{\sum_{k=0}^{M-1} G(e^{j(\omega+2\pi k/M)}) G^*(e^{j(\omega+2\pi k/M)})}}$$

where $G^*(e^{j\omega})$ is the time reversed version of filter $G(e^{j\omega})$ and $\sqrt{\cdot}$ denotes spectral factorization.

We note that the filter G(z) in general has an infinite impulse response.

In the figure the signal first passes through a filter G(z) 810 and then the combination of a downsampler 820 and upsampler 830, the combined effect of which is to retain only every M-th sample of the filtered signal. Finally the resultant signal passes through the filter G*(z) 840. Because we use two filtering and a sampling rate change, our method is clearly distinct from Eschbach.

Similar relations hold for carrying out the orthogonal projection onto multidimensional interpolated space, although in two and higher dimensionals spectral factorization are difficult to implement.

There are many different ways of implementing a projection onto an interpolated space, for example Fourier Transform.

We point out that even though orthogonal projections are the most desirable, using a non-orthogonal projection works well in practice for most cases. This is important when the orthogonal projection is difficult to implement. In practice using a non-orthogonal projection means that instead of taking the closest image that satisfies the desired property, we take one that is not necessarily closest, but still satisfies the desired property.

We point out that for one embodiment of the invention, the projection onto the interpolated space takes place in RGB space, while the projection onto the set of images that produce the encoded stream is generally in YUV. Although different measures of closeness are used in these two spaces, the algorithm converges well.

We also point out that if additional constraints on the image are known or desired, they can be included as a third step in the iterative loop of the algorithm. For example, a smoothness constraint could be imposed by lowpass filtering.

The projection onto the set of images that compress to the same output can be performed using a variation of the compression scheme where the quantization values are altered. This is covered in detail in R. Eschbach, Decompression of Standard ADCT-compressed Images, U.S. Pat. No. 5,379,122, January 1995. Thus both projections can be performed simply, and we can implement the algorithm with reasonable complexity.

Color Interpolation of Digital Camera Images and JPEG Compression

Although the algorithm we have outlined works for any interpolation scheme whose range is a space, and any convex lossy compression algorithm, a particularly important case is that of color interpolation of mosaiced digital camera images, and JPEG compression.

The Compression Block: JPEG

JPEG is a complex algorithm with many blocks, but for the purposes of this discussion we are only interested with the lossy (or non-invertible) portion of the algorithm. At the encoder this involves:

Transformation to the YcrCb (or similar space)
DCT (Discrete Cosine Transform) transformation
Quantization of DCT coefficients with a given Q-table and Q-factor At the decoder this involves:

Inverse quantization with a given Q-table and Q-factor.
Inverse DCT transformation
Inverse Color transformation to RGB.

The loss occurs in the quantization of the DCT coefficients. Each coefficient is quantized with a uniform quantizer the stepsize of which is determined by the appropriate entry in the predefined Q-table, and the Q-factor. Thus the quantized DCT coefficient is always an integer number of times the corresponding stepsize.

Observe that there would be no loss if all of the DCT coefficients happened to be equal to reconstruction levels of the quantizers. This is so because the quantizer represents ranges of possible coefficient values by a single reconstruction level. Observe that an image that has already been JPEG compressed identically has the property, that if it is compressed a second time (using the same quantization levels) the image will be unchanged. This property is exploited by a modified JPEG compression approach suitable for producing compressed images for the post-processing approach herein. This approach is treated in detail in co-pending patent application Ser. No. 08/878,170 (now U.S. Pat. No. 5,838,818), filed on even date herewith, Entitled "Artifact Reduction Compression Method and Apparatus for Mosaiced Images", with inventor Cormac Herley. Briefly stated, a process and apparatus is described therein to improve the fidelity of compressed demosaiced images by decreasing the error introduced for a given compression ratio. Because (typically) two out of three of the color values at any location of the demosaiced image are interpolated, most of the loss can be concentrated into these values, so that the actual or measured data values have little loss. This is achieved by finding an interpolation of the data such that the original measured values suffer minimal loss in the lossy compression, while the loss for the other interpolated values may be arbitrarily large. Thus, rather than performing an interpolation first and accepting whatever loss the compression scheme (e.g., JPEG) gives, the values to be interpolated are treated as "Don't cares" and then provided so as to minimize the loss for the measured values.

For one embodiment of the color interpolation process, the raw data is the plane R. We add the two interpolated planes $I_0$ and $I_1$ to form a 24-bit image. After compression the error is (R–R', $I_0$–$I_0$', $I_1$–$I_1$'). The first component, R–R', is iteratively forced to be small because this represents the error at the data locations. This is achieved by replacing R' with R then compressing and decompressing the resulting image. This process is repeated until R–R' is sufficiently small, or until a predetermined number of iterations have occurred.

Returning to the post-processing scheme, as we have discussed earlier, the images acquired by a digital camera are generally mosaiced. To get the maximum benefit from the JPEG algorithm it is first necessary to transform to some linear luminance/chrominance space such as YUV or YCrCb. To carry out this transformation it is first necessary to demosaic or color interpolate the image to have a full 24-bit image, or to have its R, G and B values at each of the locations. There are a variety of algorithms that carry out this color interpolation, see for example, Programmer's Reference Manual Models: DCS200ci, DCS200mi, DCS200c, DCS200m, Eastman Kodak Company, December 1992. For algorithms that are to be implemented on a camera, the scheme is usually very simple, such as bilinear interpolation, or a variation. This falls into the framework that we have outlined, because the set of images that are color interpolated using bilinear interpolation corresponds to a space. The JPEG standard for lossy image compression is also a transform coding method, with scalar quantization of the transform coefficients. It thus fits into our framework also. Thus we can use the projection algorithm to improve the estimate of the original image when we deal with a color interpolated image that has been JPEG compressed.

Prior Art on this Subject

It is worth pointing out that iterative algorithms have previously been applied to restoration of images in general and the reduction of coding artifacts in particular. An example of the former can be found in D. C Youla and H. Webb, Image Restoration by the Method of Convex Projections: Part I-Theory, IEEE Trans. Med. Imaging, MI-12:81–94, October 1982. Examples of the latter can be found in: S. J. Reeves and S. L. Eddins, Comments on "Iterative Procedures for Reduction of Blocking Effects in Transform Image Coding", IEEE Trans. Circuits and Systems for Video Technology, 3(6), December 1993; R. Rosenholtz and A. Zakhor, "Iterative Procedures for Reduction of Blocking Effects in Transform Image Coding"; IEEE Trans. Circuits and Systems for Video Technology, 2(1):91–95, March 1992; G. Sapiro, "Color Space Reconstruction of Compressed Images for Digital Photos", Patent Disclosure, Dec. 1994; and Y. Yang, N. P. Galatsanos, and A. K. Katsaggelos, "Regularized Reconstruction to Reduce Blocking Artifacts of Block Discrete Cosine Transform Compressed Images", IEEE Trans. Ciruits and Systems for Video Technology, 3:421–432, December 1993.

As mentioned before, a particular use of an iterative scheme to reduce artifacts introduced by JPEG is described in R. Eschbach, Decompression of Standard ADCT-compressed Images, U.S. Pat. No. 5,379,122, January 1995. The approach there has elements in common with our approach. However, although we constrain (in step 1) the image to belong to the range of images produced by a particular interpolation scheme, the approach in Eschbach merely involves filtering for high-frequency noise. Because our constraint is well defined (e.g., we know the exact nature of the color interpolation block), we can do a much better job of improving the final image than is the case with the Eschbach algorithm where the constraint is harder to define.

Further, Step 1 of our algorithm involves an orthogonal projection, which can be implemented with two linear filtering operations and a multirate sampling change. Thus our approach is clearly distinct from the method of Eschbach.

Figure 5:
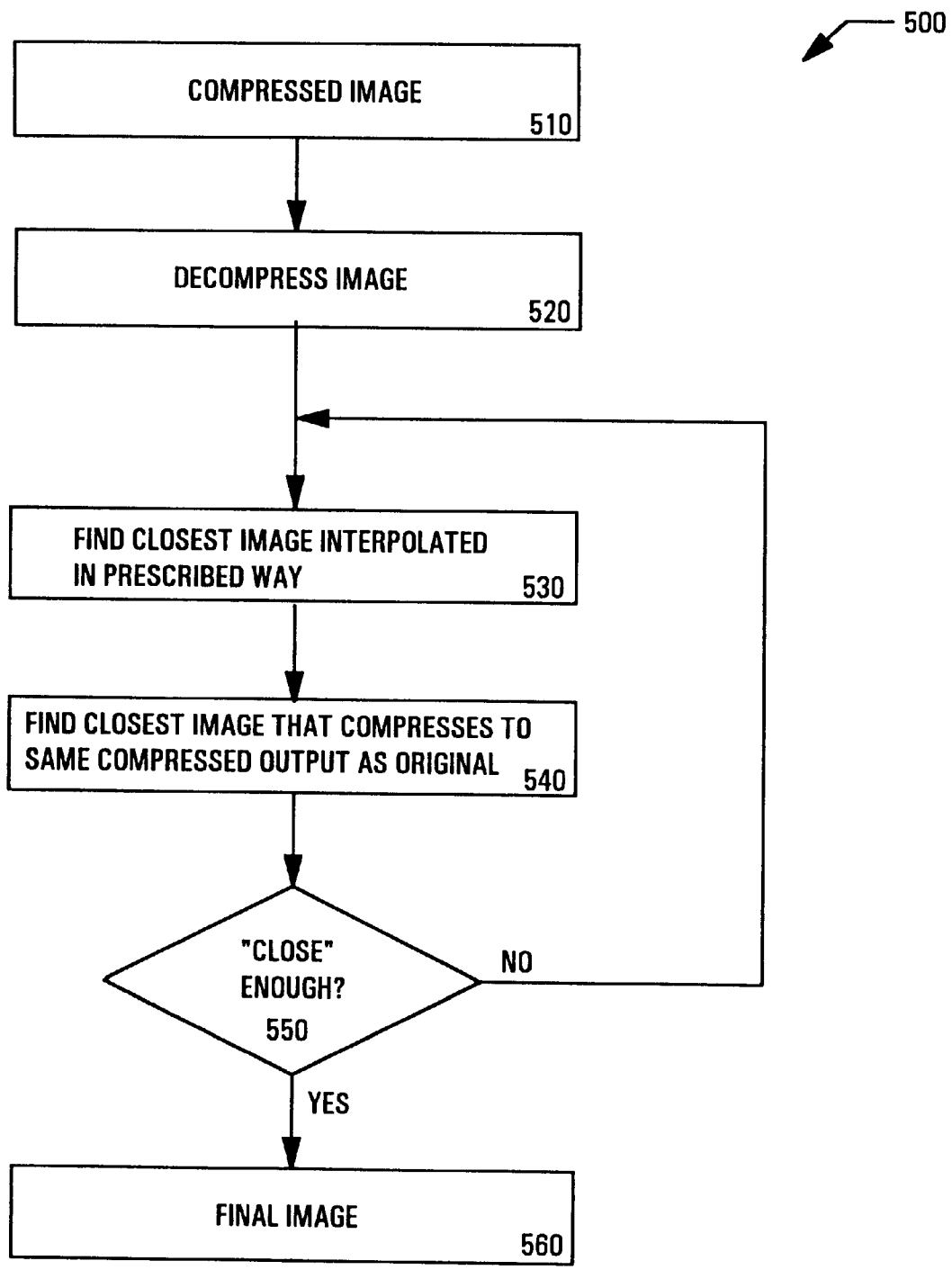
FIG. 5 is a flow chart illustrating an interpolated image decompression process that practices image compression artifact reduction according to one embodiment of the present invention.

FIG. 5 is a flow chart illustrating an interpolated image decompression process 500 that practices image compression artifact reduction as practiced according to one embodiment of the present invention. In FIG. 5, compressed interpolated image 520 is decompressed (510). The closest image interpolated in a prescribed way is found (530). The closest image that compresses to the same compressed output as the original is also found (540). A test is then performed (550) to determine whether the closest interpolated image (found in 530) is close enough to the closest image that compresses to the same compressed output as the original (found in 540). If the error from compression noise is unacceptable, then steps 530 and 540 are repeated and the resulting images are again compared (550).

This iterative process is repeated until it is determined (550) that compression noise has reduced to an acceptable level or no further improvement is achieved, at which time the final decompressed image (560) is output.

Figure 6:
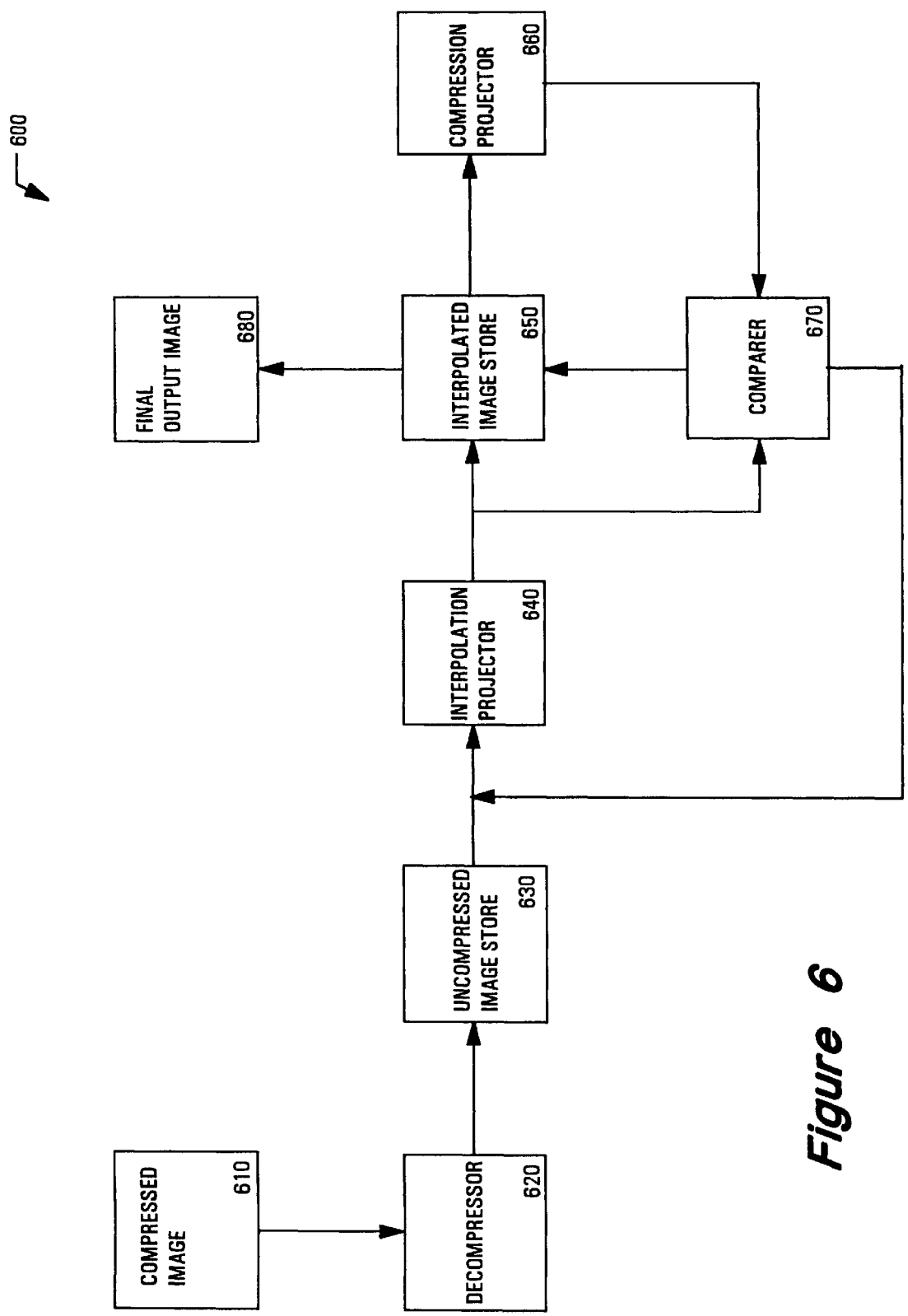
FIG. 6 is a block diagram illustrating an interpolated image decompression apparatus that practices image compression artifact reduction according to one embodiment of the present invention.

FIG. 6 is a block diagram illustrating an interpolated image decompression apparatus 600 that practices image compression artifact reduction as practiced according to one embodiment of the present invention. Compressed interpolated input image 610 is uncompressed by decompressor 620. The uncompressed image is stored in uncompressed image store 630. The uncompressed image is provided to interpolation projector 640 which finds the closest image interpolated in the prescribed way. The closest interpolated image found by interpolation projector 650 is stored in interpolated image store 650. Similarly, compression projector 660 finds the closest image that compresses to the same compressed output as the original.

Comparer 670 compares the interpolated image from interpolation projector 640 to the image from compression projector 660. If the two images are not close enough to each other, then the interpolation (640) and compression (670) projections are repeated. Again, the resulting images are compared (660).

This process iterates until comparer 670 determines that the image stored in interpolated image store 650 is close enough to the image from compression projector 660. When the two images are close enough or no further improvement is achieved, comparer 670 causes interpolated image store 650 to release the interpolated image stored in interpolated image store 620 as uncompressed output image 680. Alternately, rather than requiring convergence of the images, the iterations can stop after a certain number of iterations have occurred.

Experimental Results

Figure 7A:
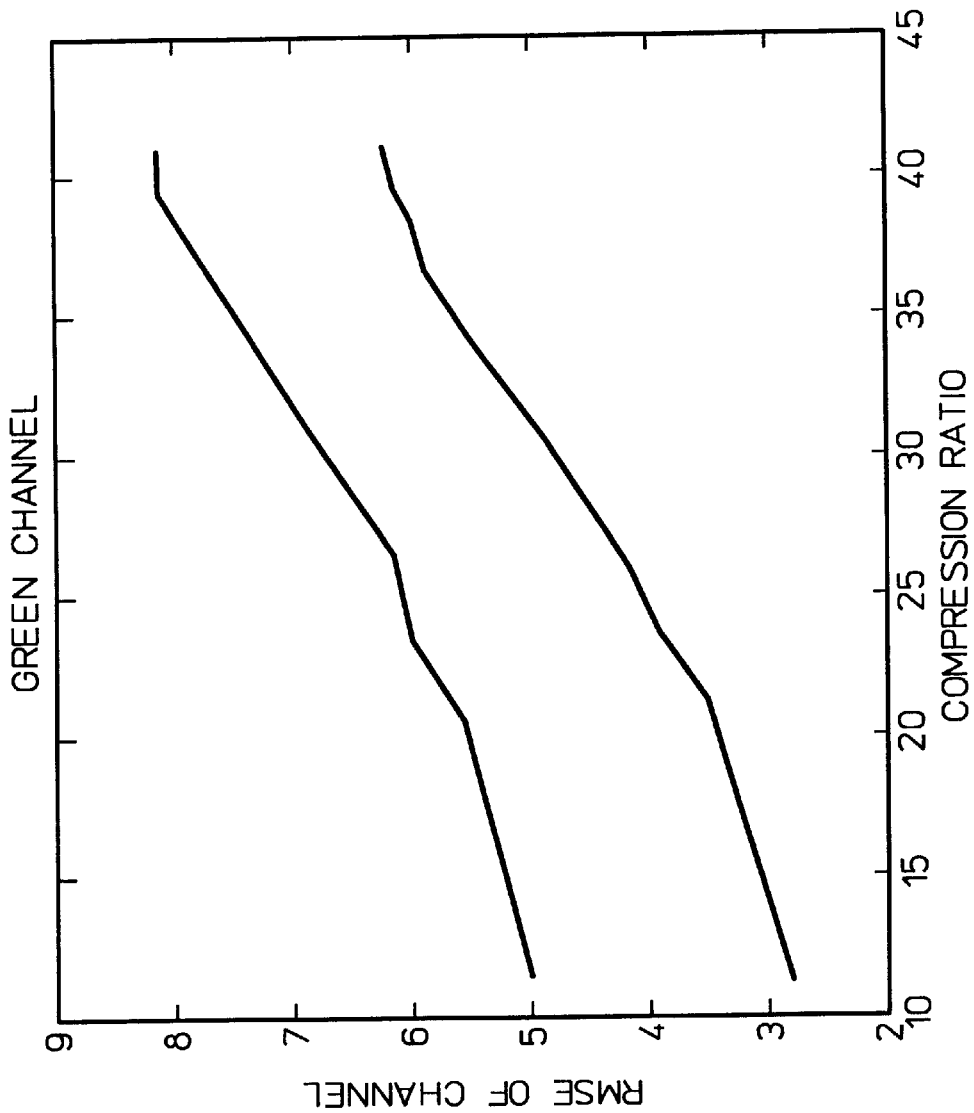
FIG. 7A is a representative comparison of Root Mean Squared Error of the green channel of a bilinear interpolated image as a function of compression ratio between a decompression scheme according to one embodiment of the present invention and a traditional image decompression scheme.
Figure 7B:
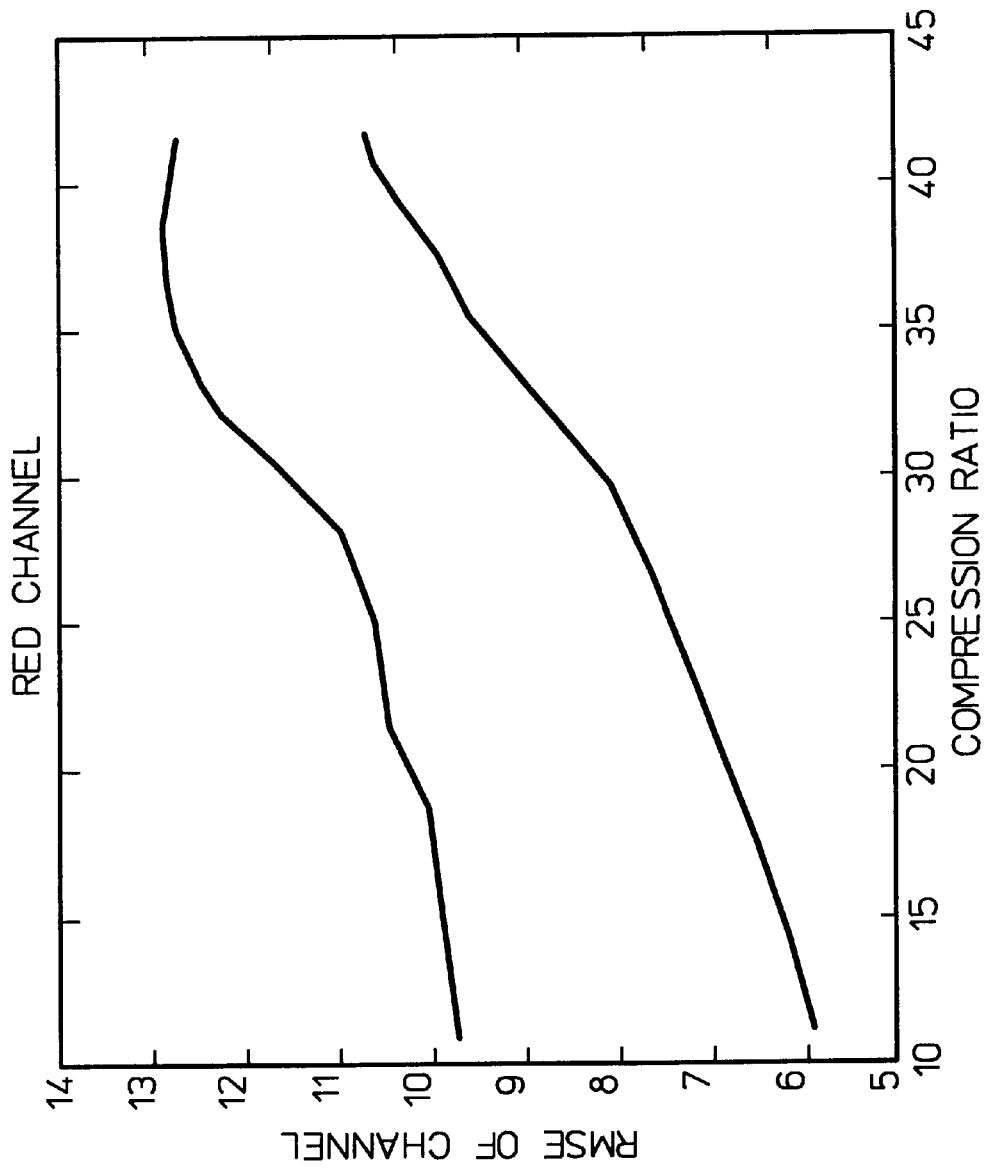
FIG. 7B is a representative comparison of Root Mean Squared Error of the red channel of a bilinear interpolated image as a function of compression ratio between a decompression scheme according to one embodiment of the present invention and a traditional image decompression scheme.
Figure 7C:
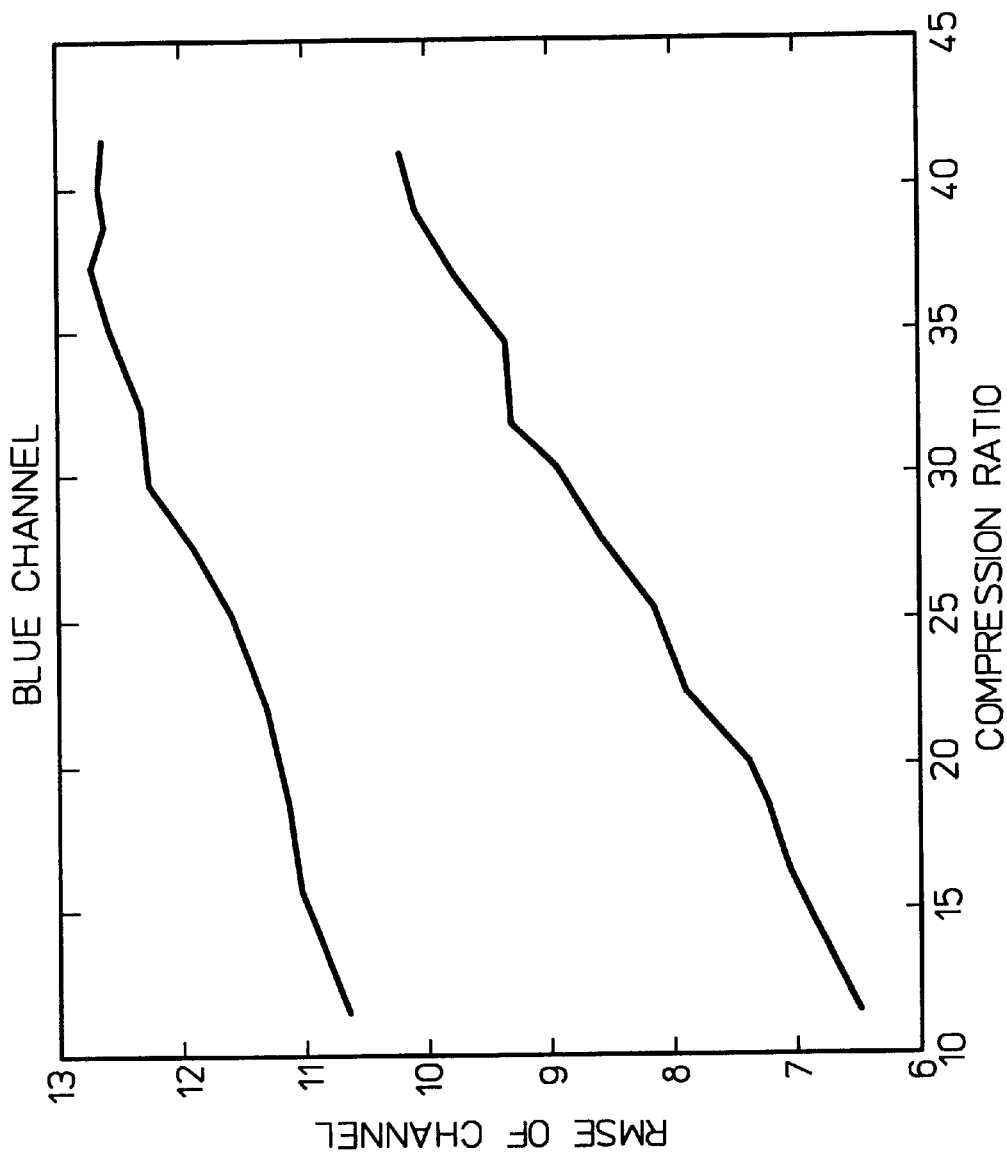
FIG. 7C is a representative comparison of Root Mean Squared Error of the blue channel of a bilinear interpolated image as a function of compression ratio between a decompression scheme according to one embodiment of the present invention and a traditional image decompression scheme.
Figure 8:
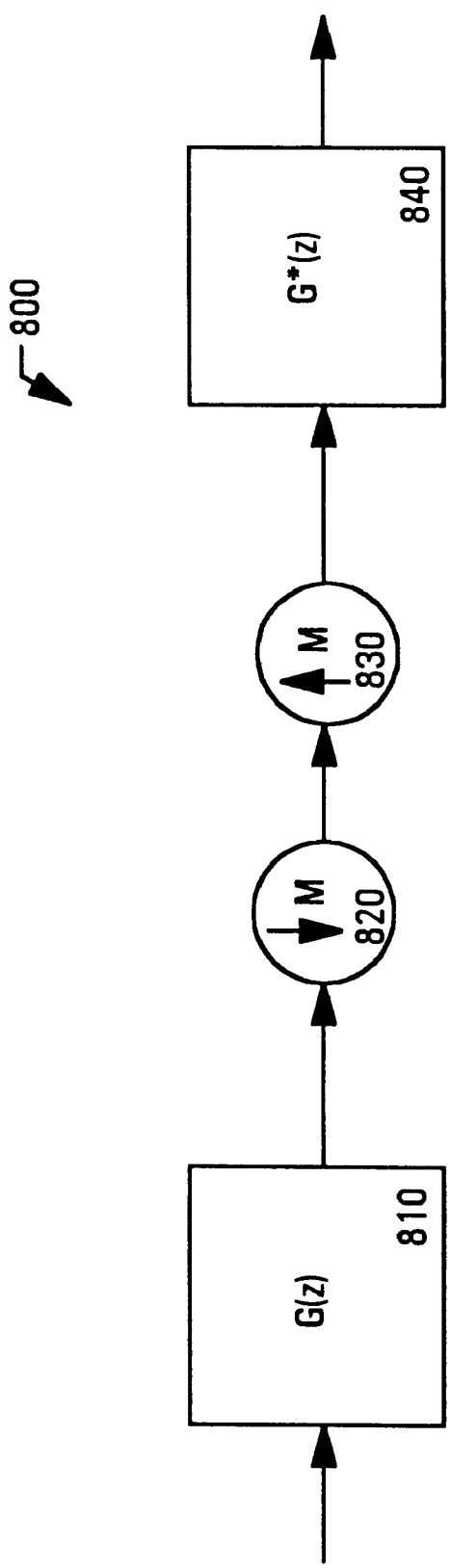
FIG. 8 is a diagram illustrating a system for orthogonal projection onto the space of interpolated signals according to one embodiment of the present invention.

FIG. 7A is a representative comparison of Root Mean Squared Error of the green channel of a bilinear interpolated image as a function of compression ratio between a decompression scheme according to one embodiment of the present invention and a traditional image decompression scheme. FIGS. 7B and 7C are corresponding comparisons of Root Mean Squared Error of the respective red and blue channels.

In order to test the efficacy of the algorithm, we carried out the post-processing on bilinearly color interpolated images obtained from a Kodak DCS-200 digital camera. We compressed the color image at various compression ratios, and compared root mean square error on each of the color channels before and after the post-processing. The results are shown in FIGS. 7A–C for the case of a detail of a representative image. In each figure, the upper line is the before post-processing case and the lower line is the after post-processing case. As can be seen from the plots, a very consistent and substantial improvement is obtained in each of the color channels at all compression ratios.

A particularly appealing aspect of the algorithm is that, while iterative in nature, a large part of the improvement is realized in the first few iterations, and even a single iteration improves the noise considerably.

From a qualitative point of view, we have compared details from images before and after post-processing. Typically, we have found the post-processed image to be sharper and to have fewer color aliasing problems than it posessed before post-processing.

The many features and advantages of the invention are apparent from the written description and thus it is intended by the appended claims to cover all such features and advantages of the invention. Further, because numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A decompression process for a compressed interpolated image wherein the compressed interpolated image was interpolated using a prescribed interpolation method prior to compressing using a known lossy compression scheme, the process comprising the steps of:
   a) finding a first image, the first image being an image that has been interpolated in the prescribed way;
   b) finding a second image, the second image being the interpolated compressed first image that has been compressed to the compressed interpolated image output by the compression scheme; and
   c) if the first image is sufficiently different from the second image, repeating steps a) and b).

2. The process as set forth in 1, comprising the step of stopping after performing step b) a predetermined number of times.

3. The process as set forth in claim 1, wherein step a) involves performing an orthogonal projection on a space of interpolated images to find the first image.

4. The process as set forth in claim 3, wherein the interpolated images are interpolated during a demosaicing process.

5. The process as set forth in claim 3, wherein the interpolated images are bilinearly interpolated.

6. The process as set forth in claim 1, wherein step b) involves finding the second image by performing an orthogonal projection on the set of interpolated images that have been compressed to the compressed interpolated image.

7. The process as set forth in claim 6, wherein the compressed interpolated images are compressed using a discrete cosine transform scheme.

8. A decompression processor for a compressed interpolated image wherein the compressed interpolated image was interpolated using a prescribed interpolation method prior to compressing using a known lossy compression scheme, the processor comprising:
   a first projector to find a first image, the first image being an image that has been interpolated in the prescribed way;
   a second projector to find a second image, the second image being the interpolated first image that has been compressed to the compressed interpolated image output by the compression scheme; and
   a comparer to compare the first and second images, and if the first image is sufficiently different from the second image, to cause the first projector to find a new first image and the second projector to find a new second image.

9. The processor as set forth in 8, wherein the decompression process stops after a predetermined number of loops.

10. The processor as set forth in claim 8, wherein the first projector performs an orthogonal projection on a space of interpolated images to find the first image.

11. The processor as set forth in claim 10, wherein the interpolated images are interpolated during a demosaicing process.

12. The processor as set forth in claim 10, wherein the interpolated images are bilinearly interpolated.

13. The processor as set forth in claim 8, wherein the second projection means finds the second image by performing an orthogonal projection on the set of interpolated images that have been compressed to the compressed interpolated image.

14. The processor as set forth in claim 8, wherein the compressed interpolated images are compressed using a discrete cosine transform scheme.

15. A decompression processor for a compressed interpolated image wherein the compressed interpolated image was interpolated using a prescribed interpolation method prior to compressing using a known lossy compression scheme, the processor comprising:
   first projection means for finding a first image, the first image being an image that has been interpolated in the prescribed way;
   second projection means for finding a second image, the second image being the interpolated first image that has been compressed to the compressed interpolated image output by the compression scheme; and
   comparer means for comparing the first and second images, and if the first image is sufficiently different from the second image, for causing the first projection means to find a new first image and the second projection means to find a new second image.

* * * * *